United States Patent
Pature et al.

(10) Patent No.: US 10,578,731 B2
(45) Date of Patent: Mar. 3, 2020

(54) METHOD FOR EVALUATING THE DISTANCE BETWEEN AN IDENTIFIER AND A VEHICLE, ASSOCIATED ELECTRONIC UNIT AND IDENTIFIER

(71) Applicant: VALEO COMFORT AND DRIVING ASSISTANCE, Créteil (FR)

(72) Inventors: Joel Pature, Créteil (FR); Eric Leconte, Créteil (FR); Laurent Petel, Créteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 0 days.

(21) Appl. No.: 15/769,177

(22) PCT Filed: Oct. 17, 2016

(86) PCT No.: PCT/EP2016/074906
§ 371 (c)(1),
(2) Date: Sep. 20, 2018

(87) PCT Pub. No.: WO2017/067891
PCT Pub. Date: Apr. 27, 2017

(65) Prior Publication Data
US 2019/0004168 A1 Jan. 3, 2019

(30) Foreign Application Priority Data
Oct. 19, 2015 (FR) .................................... 15 59958

(51) Int. Cl.
*G01S 13/74* (2006.01)
*G01S 11/06* (2006.01)
(Continued)

(52) U.S. Cl.
CPC ............... *G01S 13/74* (2013.01); *G01S 11/06* (2013.01); *G01S 13/878* (2013.01); *G01S 13/931* (2013.01); *G01S 2013/936* (2013.01)

(58) Field of Classification Search
CPC ........ G01S 13/74; G01S 11/06; G01S 13/878; G01S 13/931; G01S 2013/936
See application file for complete search history.

(56) References Cited

U.S. PATENT DOCUMENTS 6,570,486 B1 * 5/2003 Simon .................... B60R 25/04
307/10.2
2004/0100392 A1 5/2004 Brillon
(Continued)

FOREIGN PATENT DOCUMENTS

EP 2 800 068 A2 11/2014

OTHER PUBLICATIONS

International Search Report issued in PCT/EP2016/074906 dated Dec. 13, 2016 (3 pages).
(Continued)

Primary Examiner — Mohamed Barakat
(74) Attorney, Agent, or Firm — Osha Liang LLP

(57) ABSTRACT

The invention relates to a method for evaluating the distance (d) between an identifier (20) fitted with a first wireless communication module (24) and a vehicle (10) fitted with a second wireless communication module (14), including the following steps: establishing a wireless connection (L) between the first wireless communication module (24) and the second wireless communication module (14); estimating said distance (d) on the basis of a propagation time of the electromagnetic signals involved in the wireless connection established (L); when the identifier (20) comes within the range of a signal (S) transmitted by the vehicle (10), evaluating said distance (d) by means of a measurement, by
(Continued)

Figure 2:
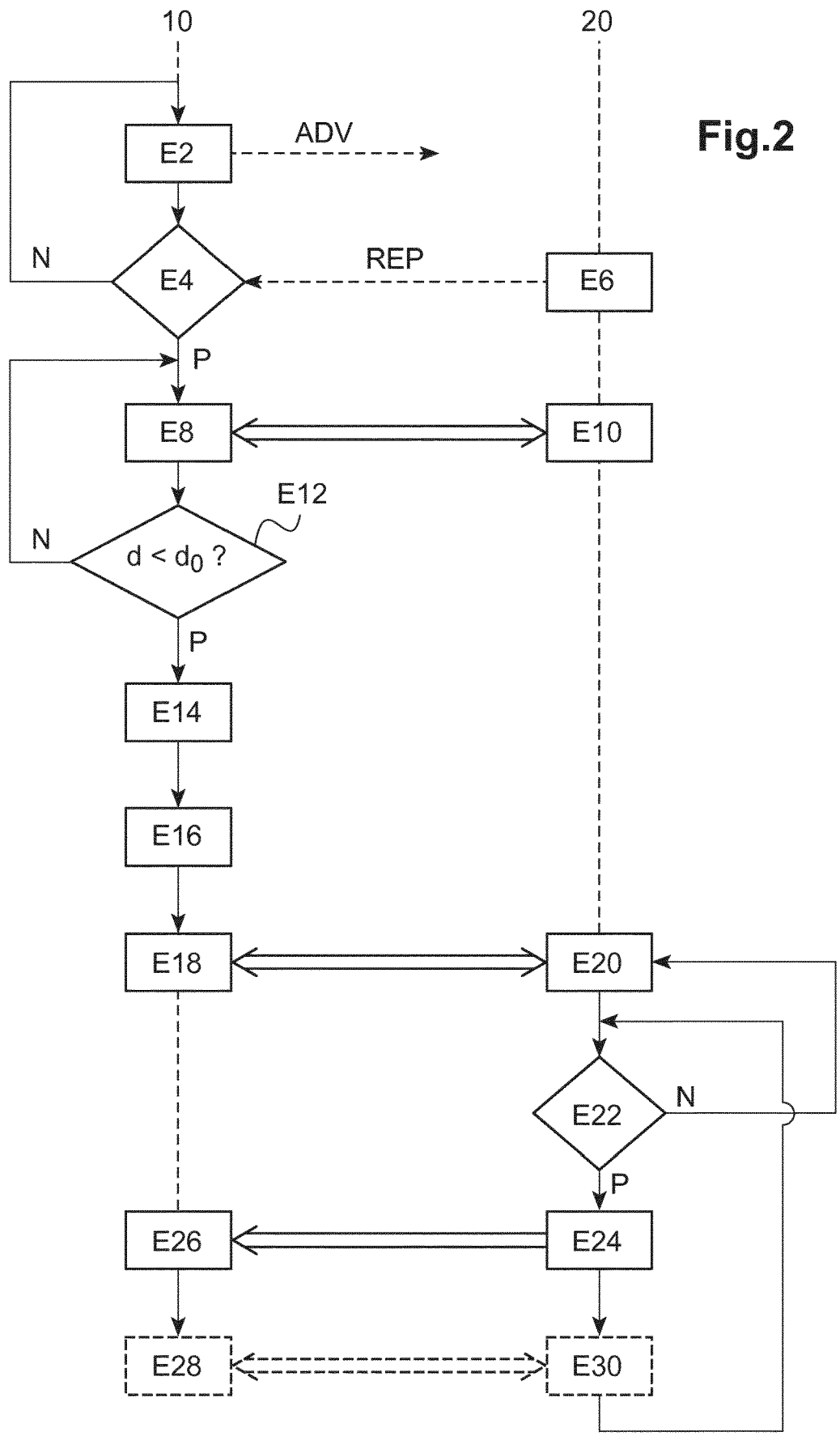

the identifier (20), of the strength of said transmitted signal (S). An associated electronic unit and identifier are also described.

13 Claims, 2 Drawing Sheets

(51) Int. Cl.
*G01S 13/93* (2020.01)
*G01S 13/87* (2006.01)
*G01S 13/931* (2020.01)

(56) References Cited

U.S. PATENT DOCUMENTS

| | | | | |
|---|---|---|---|---|
| 2007/0024416 | A1* | 2/2007 | Tang | B60R 25/245 340/5.61 |
| 2009/0264082 | A1* | 10/2009 | Tieman | G01S 1/66 455/73 |
| 2010/0305779 | A1* | 12/2010 | Hassan | G01C 17/38 701/2 |
| 2014/0129051 | A1 | 5/2014 | Gautama et al. | |

OTHER PUBLICATIONS

Written Opinion of the International Searching Authority issued in PCT/EP2016/074906 dated Dec. 13, 2016 (7 pages).

\* cited by examiner

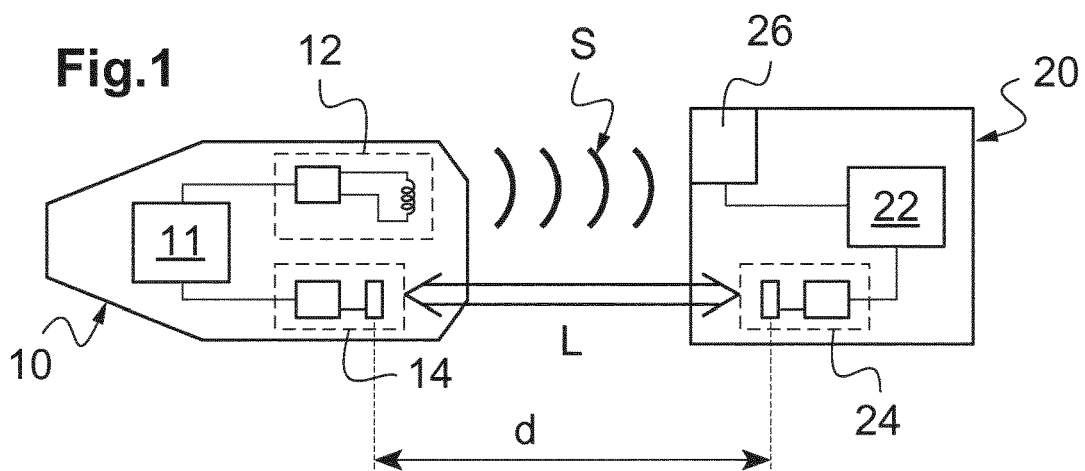
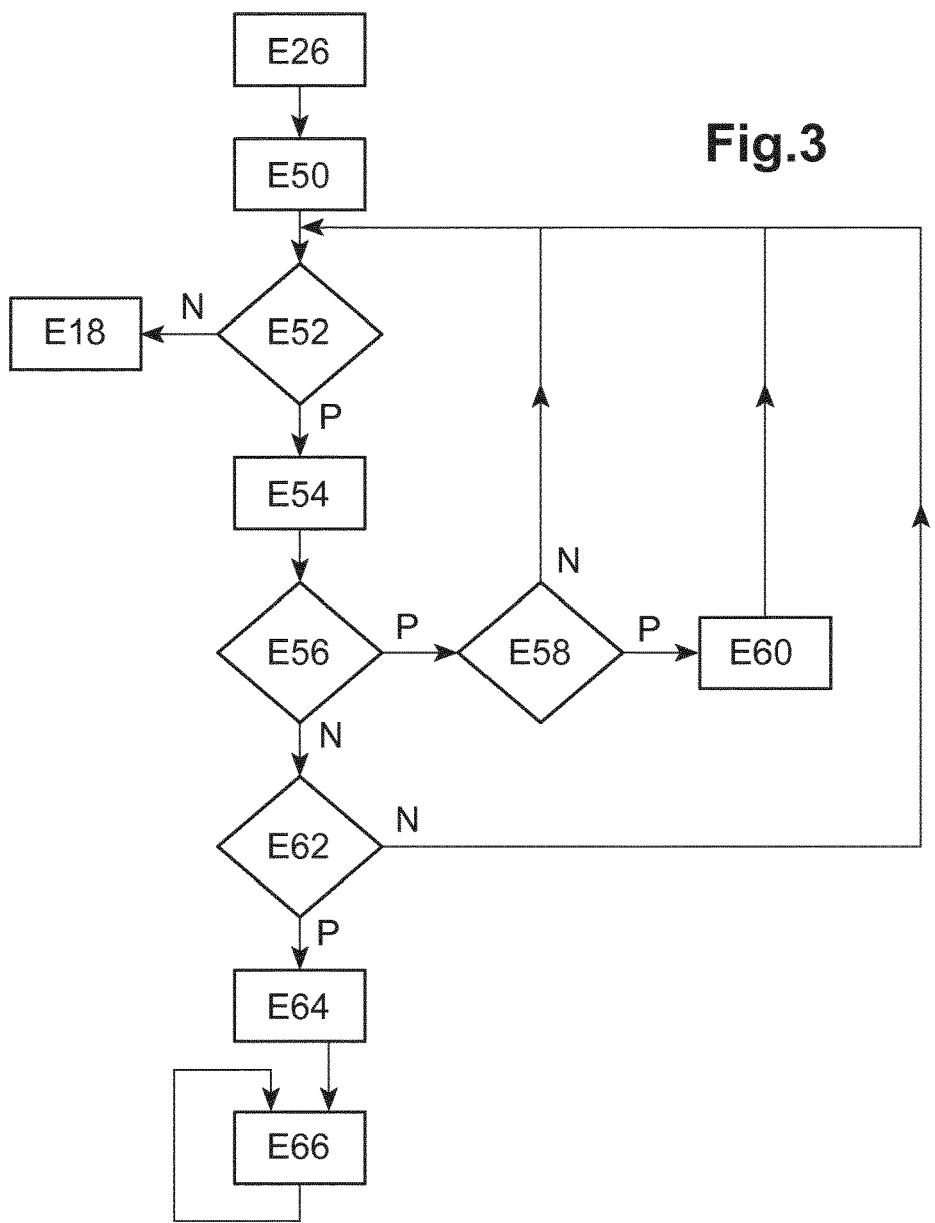

METHOD FOR EVALUATING THE DISTANCE BETWEEN AN IDENTIFIER AND A VEHICLE, ASSOCIATED ELECTRONIC UNIT AND IDENTIFIER

TECHNICAL FIELD OF THE INVENTION

The present invention relates to techniques for evaluating a distance between a vehicle and an identifier, generally carried by a user of the vehicle.

It relates more particularly to a method for evaluating the distance separating an identifier and a vehicle, and to an associated electronic unit and identifier.

The invention is applied particularly advantageously in the case where a low-frequency emitter module generates a signal whose strength is measured in order to evaluate the abovementioned distance.

TECHNOLOGICAL BACKGROUND

It is known to use an identifier, typically carried by a user of a vehicle, to detect the approach of the user and then automatically command at least one function of the vehicle (such as unlocking of the doors of the vehicle).

It is provided, for example, for this purpose, for a low-frequency emitter module of the vehicle to generate an electromagnetic signal (with a frequency of typically less than 150 kHz) having a given range.

When the identifier enters into the range of the signal emitted by the vehicle, it emits a response packet so as to indicate its presence, and communication is then established between the identifier and the vehicle, thereby normally making it possible (in particular if the identifier indeed corresponds to the vehicle in question) to bring about the implementation of the abovementioned function.

In addition, the identifier carries out a measurement of the strength of the signal generated by the low-frequency emitter module, thereby enabling it to accurately evaluate the distance separating the identifier and the vehicle (using a technique commonly called RSSI, for received signal strength indication).

This distance is generally transmitted to the vehicle via the communication that is established as indicated above, thereby enabling the vehicle to know the distance from the user, and to implement certain functions only when the user is close enough to the vehicle.

In general, it is sought to increase the range of such a system in order to detect the arrival of a user as early as possible and to evaluate the distance separating the vehicle and the identifier as soon as possible.

However, in the system described above, such an increase in range requires an increase in the size (and therefore in the weight and in the cost) of the low-frequency emitter module, which quickly offsets the benefit that this solution has in terms of accuracy.

SUBJECT MATTER OF THE INVENTION

In this context, the present invention proposes a method for evaluating the distance separating an identifier equipped with a first wireless communication module and a vehicle equipped with a second wireless communication module, comprising the following steps:

establishing a wireless link between the first wireless communication module and the second wireless communication module;

estimating said distance on the basis of a propagation time of electromagnetic signals involved in the wireless link that is established;

when the identifier enters into the range of a signal emitted at the vehicle, evaluating said distance by way of a measurement, by the identifier, of the strength of said emitted signal.

The distance between the identifier and the vehicle is thus first of all estimated in the context of the wireless link that is established, without requiring the emission of a dedicated signal at the vehicle.

The evaluation of the distance on the basis of a measurement of the strength of the dedicated signal, which measurement is relatively accurate, may thus occur only in a second phase, when the identifier is close to the vehicle.

It is thus possible to detect the arrival of the user and to estimate his distance from the vehicle relatively early (as soon as the identifier enters into the range of the wireless link), without having to increase the size of the module for emitting the dedicated signal. However, the benefit of accuracy of the measurement of the strength of the dedicated signal is experienced as soon as the user is close enough to the vehicle (the identifier entering into the range of the dedicated signal), this being particularly advantageous as an accurate evaluation is desired above all in the proximity of the vehicle.

According to features that are optional, and therefore nonlimiting:

the method comprises a step of transmitting the evaluated distance, from the identifier to the vehicle, via the wireless link that is established;

the method comprises a step of activating the emission of said emitted signal when said estimated distance is less than a predetermined value;

the method comprises a step, prior to the step of establishing the wireless link, of emitting at least one advertising packet via the second wireless communication module;

the wireless link that is established has a range of greater than 10 m;

said emitted signal has a range of less than 10 m;

said emitted signal has a frequency of less than 150 kHz;

the electromagnetic signals involved in the wireless link that is established have a frequency of greater than 1 MHz;

the wireless link that is established is of Bluetooth Low Energy type.

The invention also proposes an electronic unit for a vehicle, comprising a module for launching the establishment of a wireless link between a first communication module with which an identifier is equipped and a second communication module with which the vehicle is equipped; a module for determining or for receiving a distance estimated on the basis of a propagation time of electromagnetic signals involved in the wireless link that is established; a module for commanding the emission of a signal at the vehicle; and a module for receiving a distance evaluated, at the identifier, by measuring the strength of said emitted signal.

Lastly, the invention proposes an identifier comprising a module for launching the establishment of a wireless link between a first communication module with which the identifier is equipped and a second communication module with which a vehicle is equipped; a module for determining or for receiving a distance estimated on the basis of a propagation time of electromagnetic signals involved in the wireless link that is established; a module for measuring a strength of a signal emitted at the vehicle; and a module for evaluating a distance on the basis of the measured strength.

The optional features presented above in terms of the method may optionally apply to such an electronic unit or to such an identifier.

When the aforementioned devices (electronic unit, identifier) comprise a processor and a memory storing in particular instructions able to be executed by the processor, each of the abovementioned modules may be implemented in practice through the execution, by the processor, of a specific set of instructions that are stored in the memory (possibly in cooperation with a circuit external to the processor, such as a communication module).

DETAILED DESCRIPTION OF ONE EXEMPLARY EMBODIMENT

The following description with reference to the appended drawings, which are provided as nonlimiting examples, will facilitate understanding of the invention and how it may be carried out.

In the appended drawings:

FIG. 1 schematically shows the main elements of a system in which the invention is able to be implemented;

FIG. 2 is a flow chart showing an exemplary method implemented in the system of FIG. 1; and FIG. 3 is a flow chart illustrating timeout mechanisms that are possibly implemented at the end of the method of FIG. 2.

FIG. 1 schematically shows the main elements of a system in which the invention is able to be implemented.

Such a system comprises a vehicle 10 and an identifier 20. The vehicle 10 is equipped with an electronic control unit 11, with a low-frequency emitter module 12 and with a communication module 14.

The electronic control unit 11 comprises a microprocessor and a memory, for example. The memory stores in particular program instructions that allow, when they are executed by the microprocessor, the electronic control unit 11 to implement the methods described below. The memory also stores values or parameters that are used (as explained further on) during these methods, for example an estimated distance d between the vehicle 10 and the identifier 20, a predetermined distance do and a predefined distance $d_1$.

As a variant, the electronic control unit 11 could be embodied in the form of an application-specific integrated circuit (or ASIC).

The low-frequency emitter module 12 comprises an antenna (produced for example in the form of a wound ferrite) designed to emit a low-frequency electromagnetic signal S (typically with a frequency of less than 150 kHz) on the command of the electronic control unit 11.

The communication module 14 is designed to establish a wireless link with other electronic appliances, in this case a link of Bluetooth Low Energy (or BLE) type. The communication module 14 therefore also comprises an antenna (produced for example in the form of a conductive track) designed to emit and receive high-frequency electromagnetic signals (typically with a frequency of greater than 1 MHz, or even 500 MHz), in this case in the 2.4 GHz band.

The identifier 20 is generally carried by a user of the vehicle 10, and makes it possible to command certain functions of the vehicle 10 (for example unlocking of the doors of the vehicle 10), in particular when it is brought close to the vehicle 10, as explained hereinafter. The identifier 20 may possibly furthermore include command buttons, by way of which the user is able to command at least some of the aforementioned functions or other functions of the vehicle 10.

The identifier 20 comprises a control unit 22, a communication circuit 24 and a measurement circuit 26.

The control unit 22 is embodied by way of a microprocessor and a memory, for example. The memory stores in particular program instructions that allow, when they are executed by the microprocessor, the control unit 22 to implement the methods described below. The memory also stores values or parameters that are used during these methods, for example the item of information indicating the strength measured by the measurement circuit 26 and the distance separating the vehicle 10 and the identifier 20, as estimated on the basis of this item of information.

As a variant, the control unit 22 could be embodied in the form of an application-specific integrated circuit.

The communication circuit 24 is designed to establish a wireless link (in this case of Bluetooth Low Energy or BLE type) with other electronic appliances, in particular with the electronic control unit 11 of the vehicle 10 via the communication module 14 mentioned above.

By virtue of the wireless link L that is established between the communication module 14 of the vehicle 10 and the communication circuit 24 of the identifier 20, data are able to be exchanged between the electronic control unit 11 of the vehicle and the control unit 22 of the identifier 20, as explained further on.

The measurement circuit 26, for its part, is designed to measure the strength, at the identifier 20, of the electromagnetic signal S emitted by the antenna of the low-frequency emitter module 12 of the vehicle 10 (in accordance with a technique called RSSI for received signal strength indication) and to communicate an item of information indicating the measured strength to the control circuit 22.

As explained hereinafter, the control circuit 22 is able to deduce from this an estimation of the distance between the vehicle 10 and the identifier 20.

FIG. 2 shows an exemplary method implemented in the system that has just been described.

At the start of this method, the communication module 14 is put into an advertising mode, in which it emits advertising packets ADV, as shown by step E2 in FIG. 2. The communication module 14 is put into such a mode on the command of the electronic control unit 11, for example. In such a mode, the communication module 14 periodically emits an advertising packet ADV (for example with a period of between 0.5 s and 5 s, in this case with a period of between 1 s and 2 s), awaiting a response from another electronic appliance.

Thus, as shown by step E4, the communication module 14 determines whether it receives a response, and loops back to step E2 if not (arrow N).

For its part, the communication circuit 24 of the identifier 20 is put into a scanning mode, for example on the command of the control unit 22. In this mode, the communication circuit 24 detects the arrival of potential advertising packets emitted by other electronic appliances.

Thus, when the identifier 20 (as well as its communication circuit 24) arrives into the range of the communication module 14 of the vehicle 10 (in practice at a distance of around 35 m from the vehicle 10), the communication circuit 24 receives (within a time period equal to the maximum of the emission period of the advertising packets ADV) an advertising packet ADV emitted by the communication module 14, and, in response, emits a response packet REP in step E6.

Such a response packet REP is for example a connection request (CONNECT_REQ packet) that makes it possible to establish a connection between the communication module 14 and the communication circuit 24.

When the communication module 14 receives the response packet REP, it continues its processing operation in step E8 (arrow P following the determination of step E4).

As a variant, it may also be contemplated, for the purpose of establishing the connection, for the communication circuit 24 of the identifier 20 to be put into an advertising mode, in which it emits advertising packets ADV, and for the communication module 14 of the vehicle 10 to be put into a scanning mode. Such a solution makes it possible to reduce the consumption of electricity of the identifier 20.

In any case, after exchanges such as described above, a connection (wireless link L) is established between the communication module 14 and the communication circuit 24, and the electronic control unit 11 of the vehicle 10 and the control unit 22 of the identifier 20 are therefore able to perform various processing operations (or even step E8 for the electronic control unit 11 and step E10 for the control unit 22, respectively) by exchanging data between one another.

These processing operations comprise authentication of the identifier 20 by the electronic control unit 11, for example. In this case, the method continues as described hereinafter only if this authentication is successful.

The processing operations of steps E8 and E10 also comprise a step of estimating the distanced separating the vehicle 10 and the identifier 20 on the basis of the propagation time of electromagnetic signals used in the context of the connection L that is established, typically by measuring the time of arrival (or TOA) of the received signals or by measuring the phase of the received signals. Such an estimation is performed, for example, using the technique described in the article 'High-Precision 2.5 GHz DSSS RF Ranging', by B. D. Farnsworth and D. W. A. Taylor, ENSCO Inc.

In practice, the distance d may be estimated by the electronic control unit 11, for example in particular on the basis of information linked to said propagation time and received from the communication module 14. As a variant, the distance d may be estimated within the identifier 20 (for example by the control unit 22) and then transmitted to the electronic control unit 11 via the connection L that is established.

The electronic control unit 11 determines in step E12 whether the distance d thus estimated is less than a predetermined distance do (with for example $d_0$=15 m).

If not (arrow N), the method loops back to step E8. It may thus be provided that the distance d is estimated periodically with a given first period (for example of between 2 s and 5 s), in this case every 3 seconds (that is to say approximately every 4 meters for a user walking at 5 km/h), for as long as the distance d is greater than the predetermined distance $d_0$.

In the affirmative case, in step E12 (arrow P), the electronic control unit 11 commands the activation of initial functions of the vehicle 10 (step E14), in particular for example the deployment of external mirrors of the vehicle, the powering of certain lights of the vehicle or of internal lighting (such as the compartment light) or external lighting (such as lighting of a door handle or of a door sill) of the vehicle 10.

As a variant, the activation of initial functions could be commanded when the estimated distance (as described below in step E18) is less than a given threshold (for example equal to 10 m) that is smaller than the predetermined distance do.

The electronic control unit 11 moreover commands, in step E16, the activation of the emission of the low-frequency electromagnetic signal S by the low-frequency emitter module 12.

The low-frequency emitter module 12 is designed to have a range (in this case of the order of 5 m) less than the predetermined distance do, such that the measurement circuit 26 does not give any indication when the user is at a distance of the order of the predetermined distance do, even if the low-frequency emitter module is activated.

It is noted that using a low-frequency emitter module 12 having a relatively short range makes it possible to choose a relatively simple design, with limited bulk and mass, for the low-frequency emitter module 12.

The electronic control unit 11 and the control unit 22 then continue their exchanges (in the step referenced E18 and E20, respectively) via the wireless link that is established between the communication module 14 and the communication circuit 24.

During these exchanges, the electronic control unit 11 and/or the control unit 22 implement a step of estimating the distance d separating the vehicle 10 and the identifier 20 on the basis of the propagation time of electromagnetic signals used in the context of the connection that is established, as already mentioned above with respect to steps E8 and E10.

It may be provided for the distance d to be estimated periodically with a given second period (shorter than the abovementioned first period, and for example of between 0.5 s and 2 s), in this case every 1.5 seconds (that is to say approximately every 2 meters for a user walking at 5 km/h), for as long as the distance d is less than the predetermined distance do (and as long as no distance estimation, calculated on the basis of the measurements carried out by the measurement circuit 26, is received from the identifier 20).

As already indicated, the distance d thus estimated may possibly be used to command the triggering of initial functions when this distance d falls below a predetermined threshold.

The control unit 22 of the identifier 20 also periodically determines (in step E22) whether the measurement circuit 26 is transmitting to it an item of information indicating the measured strength of the low-frequency signal S (this occurring when the identifier 20 enters into the range of the low-frequency emitter module 12). If not (arrow N), the method loops back to step E20, in particular for the purpose of continuing the periodic determination of the distance d separating the vehicle 10 and the identifier 20 on the basis of the propagation time of electromagnetic signals used in the context of the connection L that is established.

By contrast, if the measurement circuit 26 detects the low-frequency signal S generated by the low-frequency emitter module 12 and transmits an item of information indicating the strength of this signal S to the control unit 22 (arrow P in step E22), the control unit 22 estimates, on the basis of this item of information, the distance d separating the vehicle 10 and the identifier 20, and transmits, in step E24, the estimated distance d to the electronic control unit 11 of the vehicle 10 via the wireless link L that is established between the communication module 14 and the communication circuit 24.

The electronic control unit 11 receives the estimated distance d in step E26, and is thus able to use this estimated distance d during its operation, in particular in order to accurately locate the user (the estimation of the distance d on the basis of the signal measured by the measurement circuit 26 being of the order of 0.1 m, and being generally more accurate than the estimation performed on the basis of the propagation time of electromagnetic signals used in the context of the connection L that is established).

The electronic control unit 11 may in particular compare the estimated distance d with one or more distance thresholds, for example possibly in order to activate the initial functions (in the variant in which these are not activated in step E14 described above) or to unlock the doors of the vehicle 10 (generally at a distance less than the distance for activating the initial functions).

The electronic control unit 11 of the vehicle 10 and the control unit 22 of the identifier may possibly continue their exchanges, as shown schematically in steps E28 and E30. However, it is not necessary, in this step (although it may still be contemplated), to estimate the distanced on the basis of the propagation time of the electromagnetic signals.

The operation of the control unit 22 then loops back to step E22 in order to determine whether the measurement circuit 26 is (still) transmitting to it an item of information indicating the measured strength of the low-frequency signal S.

FIG. 3 is a flow chart illustrating timeout mechanisms that may possibly be implemented at the end of the method of FIG. 2.

The method of FIG. 3 starts when the electronic control unit 11 receives, for the first time, from the control unit 22 of the identifier 20, the distance d estimated on the basis of the strength measurement carried out by the measurement circuit 26 (first implementation of step E26 described above).

The electronic control unit 11 then triggers a timer t in step E50.

The electronic control unit 11 then determines, in step E52, whether a new estimated distance value d is received from the control unit 22 of the identifier 20, for example within a given time period (typically of between 100 ms and 500 ms).

If no new estimated distance value d is received within the given time period (arrow N in FIG. 3), the method continues with step E18, already described (specifically, in this case, it is considered that the identifier 20 has left the range of the low-frequency emitter module 12 and the electronic control unit 11 is therefore effectively back in the situation of step E18).

If a new estimated distance value d is received (arrow P in step E52), this new value is used by the electronic control unit 11 in step E54, for example to determine whether the user is currently approaching the vehicle or if he is currently moving around the latter.

The electronic control unit 11 then determines, in step E56, whether the timer t reaches a predetermined first value T1 (for example less than 1 minute).

If not (that is to say if the timer t has not yet reached the predetermined first value T1 or if the timer t has reached the predetermined value T1 during a previous iteration and has therefore exceeded this predetermined first value), the method continues with step E62 described below.

When the timer t reaches the value T1 (arrow P in step E56), the electronic control unit determines, in step E58, whether the estimated distance d (received from the identifier 20 during the previous implementation of step E52) is greater than a predefined distance $d_1$ (the predefined distance $d_1$ being for example between 0.5 m and 2 m, in this case $d_1=1$ m).

If not (arrow N in step E58), the method loops back to step E52.

By contrast, if the estimated distance d is greater than the predefined distance $d_1$ (and furthermore, as seen above, if the distance d is regularly estimated on the basis of the strength measurement carried out by the measurement circuit 26 for a duration equal to the predetermined first value T1), the electronic control unit 11 commands a reduction in the strength of the signal S generated by the low-frequency emitter module 12 in step E60 (this resulting in a reduction in range of the low-frequency emitter module 12).

The consumption of electricity of the low-frequency emitter module 12 is thus reduced when the user remains, for a non-negligible time period (duration equal to the predetermined first value T1), at a distance less than the maximum range of the low-frequency emitter module 12 and greater than the predefined distance $d_1$.

It is noted that the frequency of the determination steps may possibly be increased, depending on the measured strength of the signal S generated by the low-frequency emitter module 12 and on the distance between the vehicle 10 and the identifier 20, thereby making it possible to reduce the reaction time of the system (without however increasing the consumption of electricity by virtue of the abovementioned reduction in strength).

The method then continues with step E52 described above. It is noted that the implementation of step E52 may then possibly lead to step E18, as already indicated, in particular if the reduction in strength of the signal S generated by the low-frequency emitter module 12 results in the identifier 20 no longer being within the (new) range of the low-frequency emitter module 12.

A description is now given of step E62, in which the method terminates, as already indicated, when the timer t does not correspond to the predetermined first value T1.

The electronic control unit 11 determines, in step E62, whether the timer t reaches a predetermined second value T2 (for example of between 2 minutes and 10 minutes).

If not (arrow N in FIG. 3), the method loops back to step E52.

In the affirmative case (arrow P in FIG. 3), this means that the user has remained within the range (which has possibly been reduced, as indicated above) of the low-frequency emitter module 12 for a duration equal to this predetermined second value T2, without having carried out an action such as opening a door of the vehicle or starting the vehicle.

The electronic control unit 11 in this case stops the operation of the low-frequency emitter module 12 (step E64), thereby preventing any consumption of electricity by the low-frequency emitter module 12.

The electronic control unit 11 may then determine (in step E66, and possibly periodically) the distance d between the vehicle 10 and the identifier 20 through estimation on the basis of the propagation time of electromagnetic signals involved in the wireless link L that is established between the communication module 14 and the communication circuit 24, as already indicated with respect to steps E8 and E18.

The invention claimed is:

1. A method for evaluating a distance between an identifier and a vehicle, the method comprising:
    setting the vehicle in an advertising mode, the vehicle being configured for emitting at least one advertising packet while in the advertising mode;

setting the identifier in a scanning mode, the identifier being configured for detecting an arrival of at least one potential advertising packet while in the scanning mode;

establishing a wireless link between the identifier and the vehicle using one or more electromagnetic signals;

obtaining an electromagnetic signal strength of the one or more electromagnetic signals based on an item of information received in the process of establishing the wireless link;

obtaining a propagation time of the one or more electromagnetic signals associated with establishing the wireless link;

estimating the distance based on the electromagnetic signal strength and the propagation time;

when the identifier receives a communication signal transmitted by the vehicle, measuring, by the identifier, a communication signal strength; and evaluating, by the identifier, the distance based on the communication signal strength.

2. The evaluation method as claimed in claim 1, further comprising transmitting the evaluated distance, from the identifier to the vehicle, via the wireless link that is established.

3. The evaluation method as claimed in claim 1, further comprising:

activating, by the vehicle, the transmission of the communication signal when the estimated distance is less than a first predetermined distance.

4. The evaluation method as claimed in claim 1, prior to establishing the wireless link, further comprising:

detecting, by the identifier, at least one potential advertising packet, and determining, by the identifier, that the at least one potential advertising packet detected is the at least one advertising packet.

5. The evaluation method as claimed in claim 1, wherein: the wireless link has a range of 10 meters or more and the transmitted communication signal has a range of 10 meters or less.

6. The evaluation method as claimed in claim 1, wherein the transmitted communication signal has a frequency of 150 kHz or less.

7. The evaluation method as claimed in claim 1, wherein the electromagnetic signals involved in the wireless link have a frequency of 1 MHz or greater.

8. The evaluation method as claimed in claim 1, wherein the wireless link is established using Bluetooth Low Energy.

9. The evaluation method as claimed in claim 1, wherein the wireless link is established by the identifier.

10. The evaluation method as claimed in claim 1, wherein the wireless link is established by the vehicle.

11. The evaluation method as claimed in claim 1, further comprising:

activating, by the vehicle, the emission of the communication signal when the estimated distance is less than a first predetermined distance and higher than a second predetermined distance.

12. A device for a vehicle, comprising:
a processor configured to:
  be set in advertising mode, the vehicle being configured for emitting at least one advertising packet while in the advertising mode,
  initiate an establishment of a wireless link between an identifier and the vehicle using one or more electromagnetic signals,
  obtain an electromagnetic signal strength of the one or more electromagnetic signals based on an item of information received in the process of establishing the wireless link,
  obtain a propagation time of the one or more electromagnetic signals associated with establishing the wireless link,
  estimate the distance based on the electromagnetic signal strength and the propagation time,
  when the identifier receives a communication signal transmitted by the vehicle, measure a communication signal strength,
  when the identifier is set in a scanning mode, the identifier is configured for detecting an arrival of at least one advertising packet while in the scanning mode, and
  evaluate the distance based on the communication signal strength;
a transmitter that transmits the communication signal; and
a receiver that receives a distance evaluated by the identifier.

13. An identifier comprising:
a processor configured to:
  be set in a scanning mode, the identifier being configured for detecting an arrival of at least one advertising packet while in the scanning mode,
  initiate an establishment of a wireless link between the identifier and a vehicle using one or more electromagnetic signals,
  obtain an electromagnetic signal strength of the one or more electromagnetic signals based on an item of information received in the process of establishing the wireless link,
  obtain a propagation time of the one or more electromagnetic signals associated with establishing the wireless link,
  estimate the distance based on the electromagnetic signal strength and the propagation time,
  when the identifier receives a communication signal transmitted by the vehicle, measure a communication signal strength,
  when the vehicle is set in an advertising mode, the identifier is configured for emitting at least one advertising packet while in the advertising mode, and
  evaluate the distance based on the communication signal strength;
a transmitter that transmits the distance evaluated; and
a receiver that receives the communication signal from the vehicle.

* * * * *